SHEFFIELD H. WRIGHT.

Improvement in Machines for Threading Bolts.

No. 119,681.

Patented Oct. 3, 1871.

119,681

UNITED STATES PATENT OFFICE.

SHEFFIELD H. WRIGHT, OF LOWELL, MASSACHUSETTS, ASSIGNOR TO AMERICAN BOLT COMPANY, OF SAME PLACE.

IMPROVEMENT IN MACHINES FOR THREADING BOLTS.

Specification forming part of Letters Patent No. 119,681, dated October 3, 1871.

*To all whom it may concern:*

Be it known that I, SHEFFIELD H. WRIGHT, of Lowell, in the county of Middlesex, State of Massachusetts, have invented certain Improvements in Bolt-Cutting Machines, of which the following is a specification:

The object of my invention is to produce a bolt-cutter that shall, in a great measure, be self-operating and require very little attendance, and cut the threads with precision and rapidity. To these ends, its nature consists in providing a sliding holder, in connection with a revolving die or cutter, so that the uncut bolt being placed in it the machine proceeds to cut the thread, and, when cut the desired length, the holder hitting an adjustable collar on a rod near it, with the assistance of a spring or weight reverses the motion of the die, and when free of the bolt the attendant draws back the sliding holder, hitting another adjustable collar, reversing the die to its original motion, when the attendant, removing the finished bolt, puts in another, and the process is repeated.

Figure 1:
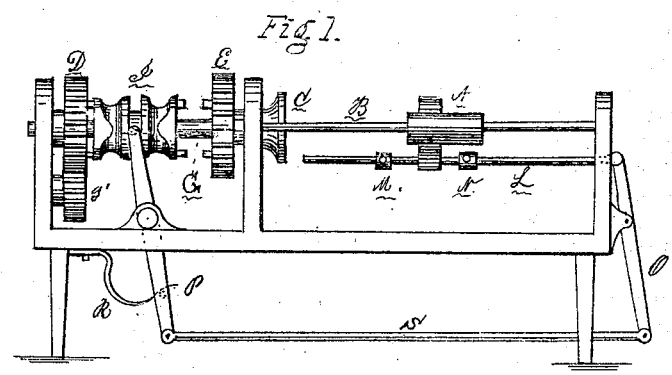
Figure 2:
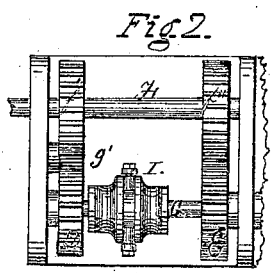
Figure 3:
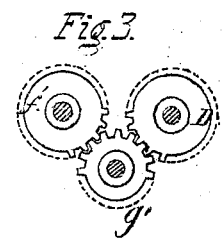

The drawing shows a side view of a machine embodying my invention in Figure 1, and Fig. 2 is a plan of the driving-shaft and gear. Fig. 3 shows two gears and their intermediate.

A is the holder, arranged to slide on the ways B. C is the die or cutter, which is driven through its gears D E by means of the clutch I moving on a spline on the cutter-shaft in either direction, the driving-shaft F having two gears fast on it, one, $f'''$, gearing into E on the cutter-shaft G, and the other, $f'$, by an intermediate gear, $g$, into D, so that by means of the clutch I, which slides on the shaft G and connects it to either of the gears D or E, when desired, the cutter is driven in either direction, according to the position of the clutch I being in junction with D or E, and to stand still when it is thrown out of D. L is a rod, with two adjustable collars, M, and connected to the clutch N by the levers O and P and rod S, and has a spring, R, so arranged as to finish the motion necessary to carry the clutch into gear D to reverse the motion of the die or cutter after the motion has released the clutch from the gear E, and run it off the bolt when finished. The attendant places the uncut bolt in the holder A and throws the clutch into gear E, and the machine cuts to the desired point, when the holder hits the collar M and pushes the clutch I out of gear E, and the spring R throws it into the gear D and the motion of the cutter is reversed, and the holder runs back until the bolt is released; then the attendant draws back the slide A, which, hitting the collar N, throws out the clutch and reverses the machine.

What I claim in bolt-cutting machines is—

The combination of the bolt-holder A, rods and levers L, O, S, and P, adjustable collars M N, spring R, and clutch I, as and for the purposes set forth.

SHEFFIELD H. WRIGHT.

Witnesses:
  CHAS. A. F. SWAN,
  F. W. SARGENT, Jr. (66)